(12) United States Patent
Laukhuf et al.

(10) Patent No.: US 6,388,190 B1
(45) Date of Patent: May 14, 2002

(54) MODULAR POWER ASSEMBLY WITH SWITCH

(75) Inventors: Gregg E. Laukhuf, Bryan, OH (US); Michael J. Pequignot, II, Fremont, IN (US)

(73) Assignee: Dekko Engineering, Inc., Butler, IN (US)

( * ) Notice: Subject to any disclaimer, the term of this patent is extended or adjusted under 35 U.S.C. 154(b) by 0 days.

(21) Appl. No.: 09/430,659

(22) Filed: Oct. 29, 1999

(51) Int. Cl.7 .............................................. H02G 13/00
(52) U.S. Cl. ........................... 174/48; 52/220.7; 52/239
(58) Field of Search ............................... 174/48, 49, 53, 174/58, 59, 50; 52/220.1, 220.2, 220.3, 239, 220.7

(56) References Cited

U.S. PATENT DOCUMENTS

| | | | |
|---|---|---|---|
| 2,260,178 A | 10/1941 | Guignon, Jr. ................. | 180/34 |
| 3,377,756 A | 4/1968 | Polhamus ..................... | 52/220 |
| 4,349,995 A | 9/1982 | Dowler et al. ................ | 52/241 |
| 4,631,881 A | 12/1986 | Charman ..................... | 52/220 |
| 4,930,047 A * | 5/1990 | Peterson ..................... | 361/395 |
| 5,164,544 A * | 11/1992 | Snodgrass et al. ............ | 174/48 |
| 5,277,005 A | 1/1994 | Hellwig et al. ............. | 52/220.1 |
| 5,357,055 A * | 10/1994 | Sireci ......................... | 174/48 |
| 5,444,955 A | 8/1995 | Ou ............................ | 52/309.9 |
| 5,778,612 A | 7/1998 | Kissinger et al. ............. | 52/205 |
| 5,780,775 A * | 7/1998 | Yu ............................. | 174/135 |
| 5,804,763 A | 9/1998 | Smeenge ..................... | 174/48 |
| 5,826,385 A | 10/1998 | Dykstra et al. ............ | 52/220.7 |
| 6,051,785 A * | 4/2000 | Baldwin et al. .............. | 174/54 |

* cited by examiner

Primary Examiner—Dean A. Reichard
Assistant Examiner—Hung T Nguyen
(74) Attorney, Agent, or Firm—Taylor & Aust, P.C.

(57) ABSTRACT

A modular electrical assembly for use in a prefabricated wall panel of an office partition system includes a housing disposed within the hollow interior of the prefabricated wall panel. At least one electrical receptacle is operatively disposed within the housing. A connector electrically connects to an electrical distribution box disposed within the prefabricated wall panel to thereby electrically connect the connector to a source of electrical current. A switch electrically interconnects the electrical receptacle and the connector the switch selectively controlling the flow of electrical current between the electrical receptacle and the connector. The switch is disposed within a cut-out in the prefabricated wall panel, thereby exposing the switch from within the hollow interior of the wall panel to an exterior thereof.

20 Claims, 3 Drawing Sheets

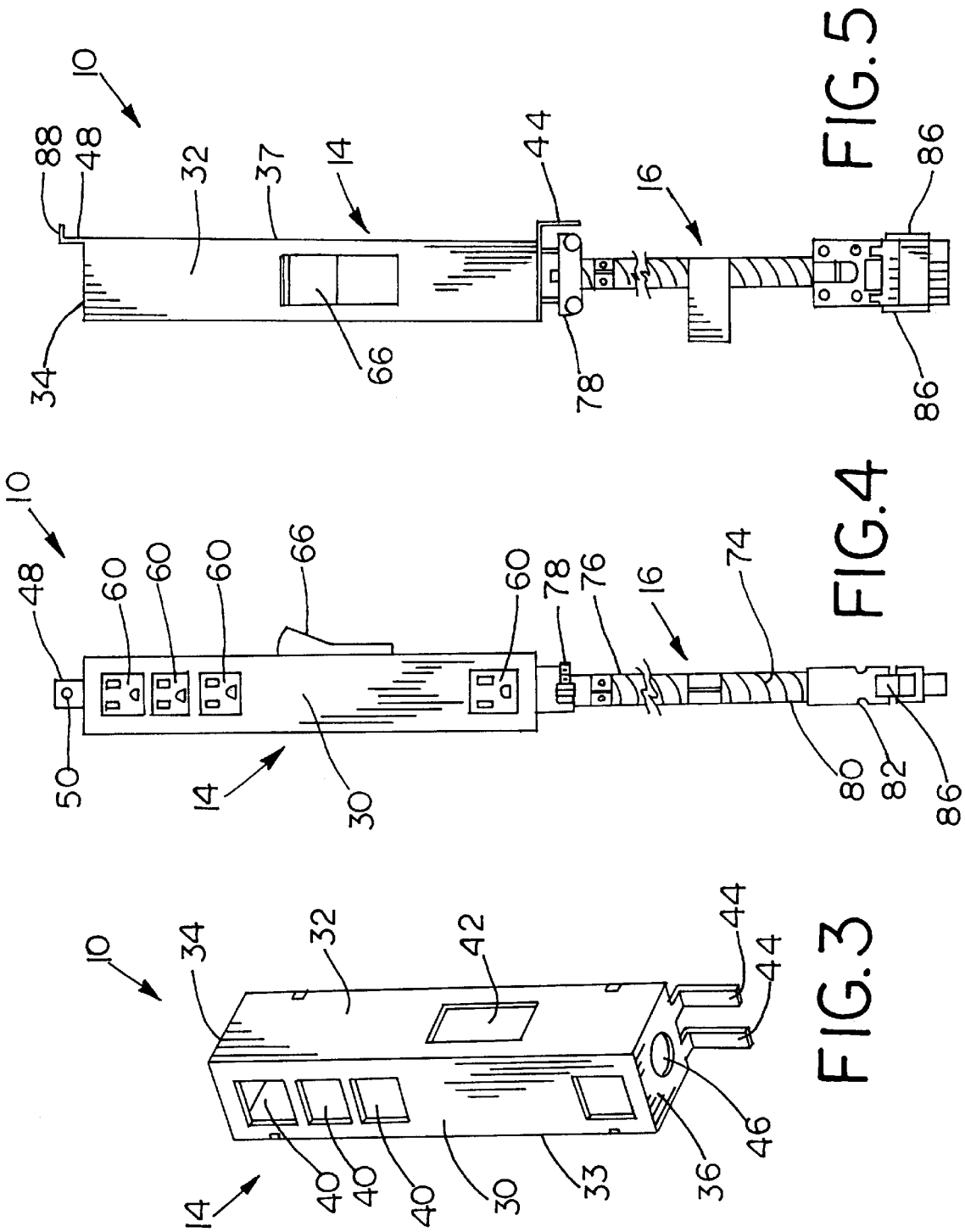

MODULAR POWER ASSEMBLY WITH SWITCH

BACKGROUND OF THE INVENTION

1. Field of the Invention

The present invention relates to an electrical box and, more particularly, to an electrical box that is mounted within a prefabricated panel of an office wall partition system.

2. Description of the Related Art

Free-standing, prefabricated office partition systems are increasingly used within the contemporary office. These free-standing office partitioning systems are composed of separate or modular wall panels that are selectively arranged and connected together to define individual office areas, also known as cubicles. The individual wall panels typically include a frame and two planar wall members that attach to and cover the frame. Thus, a hollow space or interior is defined between the two planar wall members. Typical wall panels may further include provisions for the routing of data and/or electrical cables within the hollow interior of a single wall panel, or within a frame member of a wall panel. Further, provisions are also made for the routing of such cables from the interior or frame member of one wall panel to the interior or frame member of another wall panel.

An electrical receptacle can be connected to the electrical cables carried within the individual wall panels. Such an electrical receptacle may be hard-wired to the electrical cables carried by the wall panel. The completion of such a hard-wired connection of the electrical receptacle to the electrical cables carried by the wall panel requires a certain degree of training and skill. Furthermore, such a hard-wired installation of an electrical receptacle is time-consuming and labor intensive, even for those with the requisite training and skill.

The body of such an electrical receptacle is typically disposed adjacent to or mounted on the office wall panel within a cubicle. The power cord for each light and/or piece of office equipment within the cubicle must be routed to a receptacle in order to be plugged into the electrical receptacle. Thus, an employee must individually power on and off each light and each piece of equipment within his or her cubicle using the power switch, if any, provided on the various lights and pieces of equipment. In the contemporary office or cubicle, this could easily involve powering on and/or off more than five pieces of office equipment and numerous task lights. The need to individually power on and off each individual piece of office equipment and each light consumes a certain amount of time, and thus decreases the productivity of each employee. Further, additional time is consumed and productivity decreased when, for example, an employee discovers that a needed piece of equipment is not or has not been powered on and, after turning it on, he or she has to wait for that piece of equipment to warm up or run a diagnostic check before that piece of equipment can be used to perform the intended task.

Yet another source of lost productivity and cost is attributable to the need to individually power on and off each cubicle light and individual piece of office equipment due to the increased likelihood that an employee will overlook, forget, or simply choose not to power off at least one piece of equipment. Thus, an increase in electricity usage and cost may be incurred when, for example, a cubicle light or a piece of equipment is left on during non-business hours., over a weekend, an extended holiday or vacation.

The power cables for the multiple task lights and pieces of office equipment found in a contemporary cubicle typically lie along the cubicle floor or on top of the cubicle work surfaces. These power cables, along with the multiple data and computer network cables create an unsighltly entanglement of wires. Furthermore, such an entanglement of wires makes it difficult for installation and repair personnel to trace an individual wire from its source to its destination.

What is needed in the art is an electrical assembly that includes a plurality of electrical receptacles and mounts within the wall panel of a prefabricated office/cubicle partition system, and further includes a user-accessible switch that controls the powering on and off of the plurality of electrical receptacles. Moreover, what is needed in the art is an electrical assembly that easily connects to existing power distribution networks within such prefabricated office partition systems, and thereby avoids the need for the hard-wired connection of electrical receptacles.

SUMMARY OF THE INVENTION

The present invention provides a modular electrical assembly that mounts within an individual wall partition/panel of an office partitioning system and contains a plurality of simplex outlets. The modular electrical assembly connects with a power distribution system within the wall partition/panel system. The modular electrical assembly includes a user-accessible switch that activates and deactivates the electrical receptacles within the assembly. The switch is the only portion of the modular electrical assembly that extends from the office wall panel after installation of the assembly.

An advantage of the present invention is that the wiring of lights and other office equipment can be routed entirely within an office wall panel, thereby avoiding a confusing mass of wires on the floor of a cubicle.

Another advantage of the present invention is that the modular electrical assembly plugs directly into an existing electrical power distribution network within the office partition system, thereby avoiding the need for separately mounting and hard-wiring multiple electrical receptacles.

Yet another advantage of the present invention is that the modular electrical assembly includes a switch that activates and deactivates the electrical receptacles, thereby allowing the powering on or oft of every piece of office equipment supplied with power from the receptacles of the modular electrical assembly.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 3 is a perspective view of the housing of the modular electrical assembly of FIG. 1;

FIG. 4 is a front view of the modular electrical assembly of FIG. 1; and

FIG. 5 is a side view of the modular electrical assembly of FIG. 1.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
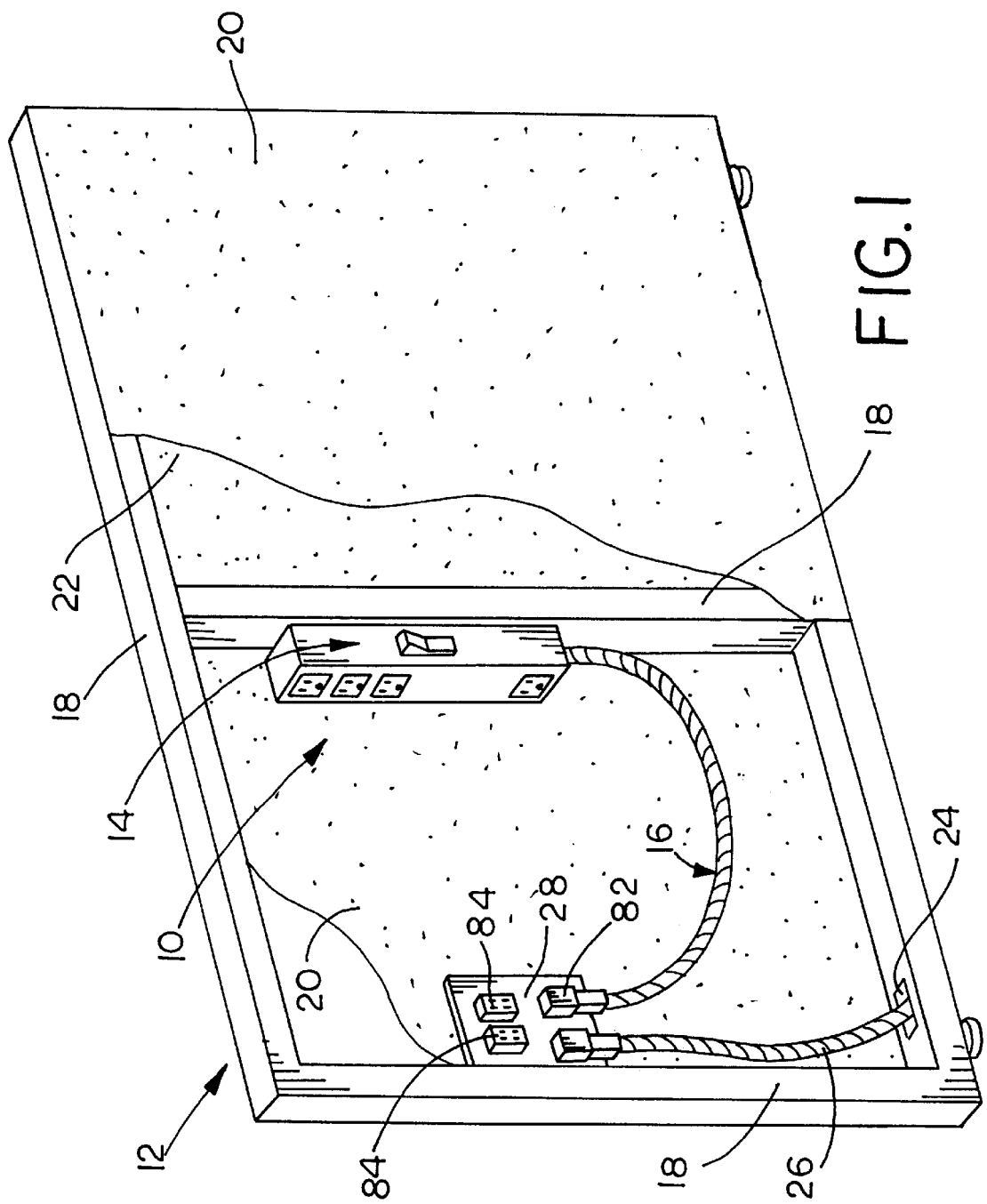
FIG. 1 is a perspective, partially-sectioned view of an embodiment of the modular electrical assembly of the present invention.
Figure 2:
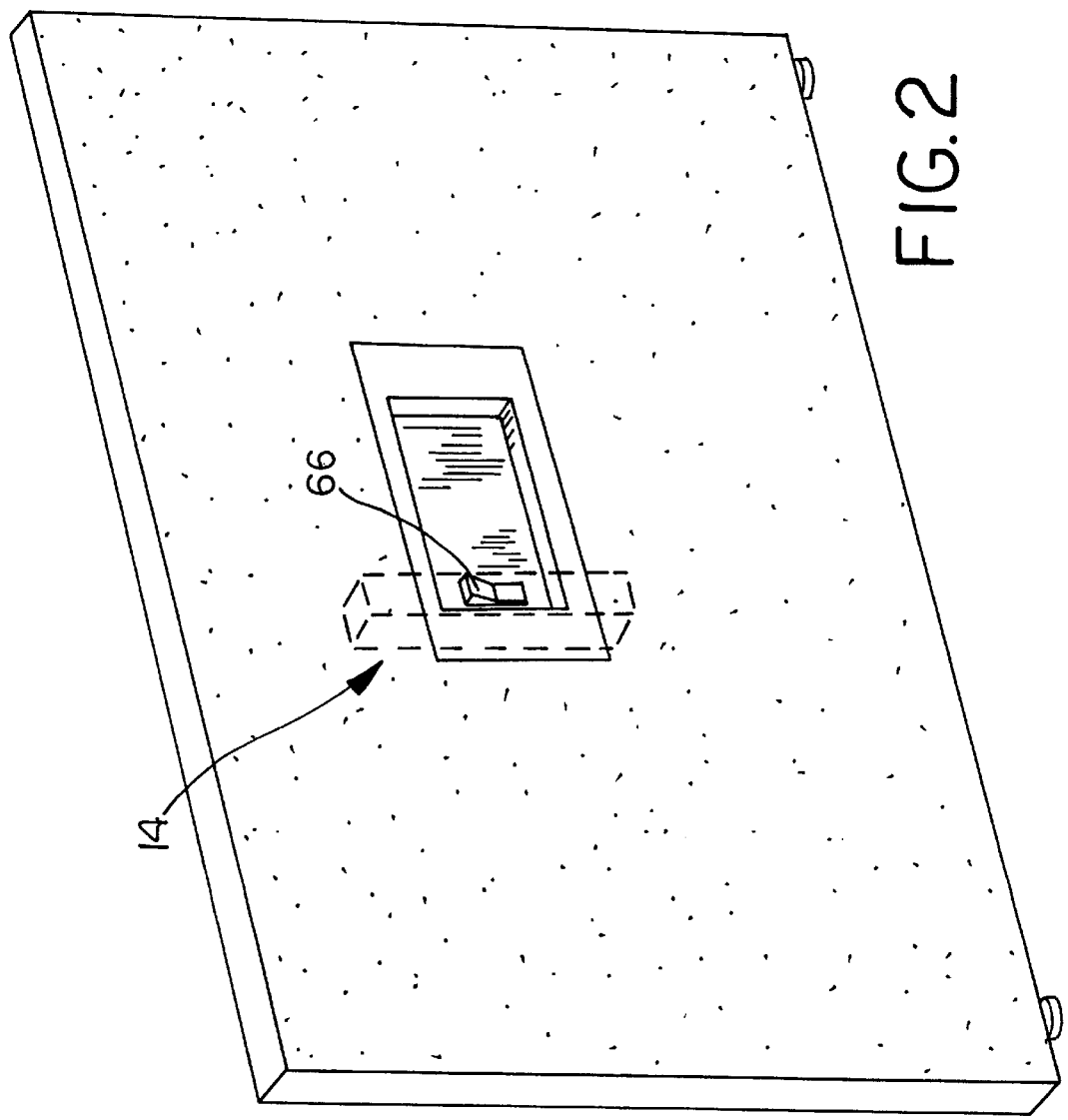
FIG. 2 is a perspective view of an embodiment of the modular electrical assembly of the present invention.

Referring now to the drawings, and particularly to FIG. 1, there is shown one embodiment of a modular electrical assembly 10 of the present invention. Modular electrical assembly 10 is attached to and mounted within office partition panel 12, and includes receptacle housing 14 and connector section 16.

Partition panel 12 includes frame members 18 with side panels 20 on either side thereof. The side panels 20 are attached to and spaced apart by frame members 18, thereby defining a hollow interior 22 between side panels 20 that typically ranges from approximately 1.5 to 3 inches in width. The actual height and width of partition panel 12 may of course vary depending upon the specific application. Partition panel 12 further includes at the bottom thereof a raceway 24 for carrying electrical components such as electrical distribution harness 26, telecommunications cabling, and various other wiring (not shown). Distribution harness 26 connects electrical distribution box 28 to a source of electrical current (not shown). Distribution box 28 is disposed within interior 22 of partition panel 12.

Receptacle housing 14 of modular electrical assembly 10 includes, as best seen in FIGS. 3–5, a front face 30, sides 32 and 33, top surface 34, bottom surface 36, and back 37. Front face 30) includes a plurality of vertically-aligned rectangular apertures 40 formed therein. Side 32 includes a rectangular aperture 42 formed therein. Integral with bottom surface 36 are two spaced apart tabs 44 extending substantially perpendicularly therefrom. An aperture 46 is included in and defined by bottom surface 36. Integral with and extending from top surface 34 is an L-shaped bracket 48 having an aperture 50 formed therein. In the embodiment shown, receptacle housing 14 is constructed of stamped or formed sheet metal. However, it is to be understood that receptacle housing 14 can be alternately constructed of, for example. injection-molded plastic or fiberglass.

Electrical receptacles 60 are contained within receptacle housing 14, and are operatively disposed within a respective one of apertures 40. Electrical conductors (not shown) are connected to each of receptacles 60. The electrical conductors are routed within receptacle housing 14, from the receptacles 60 through aperture 46 to connector section 16. In the embodiment shown, electrical receptacles 60 are simplex-type electrical receptacles. However, it is to be understood that electrical receptacles 60 can be alternatively configured as, for example, a duplex receptacle or a 220V receptacle. Furthermore, in the embodiment shown, there are four electrical receptacles 60. However, it is to be understood that modular electrical assembly 10 can be constructed so as to house virtually any number of electrical receptacles.

Switch 66 is attached to modular electrical assembly 10, and is contained within and operatively exposed by aperture 42. Switch 66 is held in place within aperture 42 by screws (not shown) extending through each of apertures 68 and tlreadingly engaging corresponding apertures (not shown) integral with and carried by switch 66. Switch 66 is a rocker type, single-pole single-throw switch.

Connector section 16 includes a length of conduit 74 having a first end 76 attached to receptacle housing 14 by a conduit clamp 78, and a second end 80 attached to connector 82. Conduit section 74 protectively encloses a plurality of electrical conductors or wires which interconnect electrical receptacles 60 and switch 66 with connector 82. Conduit 74 may be of any required length and may be constructed of any suitable material that is durable, resistant to cuts and/or punctures, yet has a degree of flexibility to enable routing of the conduit, such as, for example, polyvinyl chloride or flexible metal tubing.

Connector 82 connects the electrical conductors from each electrical receptacle 60 and switch 66 to electrical distribution box 28 which, in turn, is connected to a source of electrical current (not shown) by distribution harness 26. Thus, each of receptacles 60 and switch 66 is connected to a source of electrical current. In the embodiment shown, connector 82 is a male spade-type connector that simply pushes into a mating female connector 84 of electrical distribution box 28. Connector 82 includes two elastically-deformable arms or snap members 86 which, as connector 82 is inserted into female connector 84, deform and then snap over corresponding projections (not shown) on female connector 84, thereby securing connector 82 in position. However, it is to be understood that connector 82 can be any suitable type of connector that is mateable with the particular electrical distribution box or system in use within partition panel 12. For example, connector 82 may be constructed, or keyed, such that it mates with an electrical distribution system of a specific manufacturer or manufacturers. Furthermore, connector 82 may, for example, be configured such that modular electrical assembly 10 is electrically connected to a specific subset of conductors within the electrical distribution system and thereby a specific electrical circuit. Moreover, it is to be understood that connector 82 can be of the screw-terminal or push-terminal type, thereby allowing for the direct connection, or hard wiring, of modular electrical assembly 10 to conductors supplying electrical current.

In use, modular electrical assembly 10 is installed within interior 22 of partition panel 12 by engaging bottom tabs 44 of modular electrical assembly 10 with corresponding channels (not shown), or notches, formed in frame member 18 of partition panel 12. Tongue 88 of the L-shaped bracket 48 is then engaged with a corresponding notch or channel within frame member 18 of partition panel 12. A fastener, such as a screw or bolt, is inserted through aperture 50 in bracket 48 and threadingly engages an aperture in frame member 18 of partition panel 12. Connector 82 of modular electrical assembly 10 is inserted into corresponding connector 84 of electrical distribution box 28, thereby connecting each of receptacles 60 and switch 66 to a source of electrical current. Individual power cords for office equipment, such as lights, computers, printers, and fax machines are then routed within partition panel 12 and plugged into receptacles 60. A portion of side panel 20 is removed or punched out such that, when side panel 20 is installed by attachment to frame members 18, only switch 66 of modular electrical assembly 10 is exposed (FIG. 3). Switch 66 is then selectively operated to power on and off each of receptacles 60. Thus, each piece of office equipment plugged into modular electrical assembly 10 can be powered on or off via switch 66.

In the embodiment shown, switch 66 is a rocker-type switch. However, it is to be understood that switch 66 can be configured as virtually any type of switch, such as, for example, a dimmer, single-pole single-throw, or pushbutton switch. Furthermore, it is to be understood that switch 66 can be configured as a motion sensing or infra-red activated switch. Switch 66, when configured as a motion or infra red sensing switch may further include timer and/or control circuitry which delay the powering off of electrical receptacles 60 within modular electrical assembly 10.

In the embodiment shown there is a single switch 66 controlling each and every electrical receptacle 60 within modular electrical assembly 10. However, it is to be understood that multiple switches may be associated with modular electrical assembly 10 to separately control a group of electrical receptacles, or to control each electrical receptacle individually. Moreover, in the embodiment shown, each of electrical receptacles 60 is controlled by switch 66. However, it is to be understood that one or more of receptacles 60 may be unswitched. For example, the interconnection between switch 66 and one or more of electrical receptacles 60 within receptacle housing 14 can be configured such that switch 66 is not in the circuit of one or more of electrical receptacles 66. Thus, that particular receptacle or receptacles would be connected via connector 82 directly to electrical distribution box 28 (i.e. unswitched). Thus, switch 66 is bypassed with regard to that particular electrical receptacle. In this embodiment, a particular piece of office equipment which is not desired to be powered off, such as, for example, a fax machine, can be connected to that particular, unswitched electrical receptacle and be unaffected by the operation of switch 66.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A prefabricated wall panel assembly for use in office partitioning systems, comprising:
   a frame;
   a pair of planar wall panels attached to and spaced apart by said frame, at least one of said planar wall panels including a cut out formed therein;
   a hollow interior defined by an inside surface of each said planar wall panel and said frame;
   an electrical distribution box disposed within said hollow interior and configured for being electrically connected to an electrical distribution system, said electrical distribution box including at least one connector receptacle, each connector receptacle positioned within and facing into said hollow interior; and
   a modular electrical assembly disposed within said hollow interior, said modular electrical assembly comprising:
      a housing;
      at least one first electrical receptacle operatively disposed within said housing and facing into said hollow interior;
      a connector configured for connecting to said connector receptacle of said electrical distribution box to thereby electrically connect said connector to the electrical distribution system; and
      a switch electrically interconnected between said at least one first electrical receptacle and said connector, said switch selectively controlling a flow of electrical current between said at least one first electrical receptacle and said connector, said switch being disposed at least partially within said cut out in said planar wall panel, thereby exposing at least a portion of said switch from within said hollow interior to an exterior of said wall panel assembly.

2. The prefabricated wall panel assembly of claim 1, wherein said modular electrical assembly further comprises at least one second electrical receptacle electrically connected directly to said connector, thereby electrically connecting said at least one second electrical receptacle to the electrical distribution system.

3. A prefabricated wall panel assembly for use in office partitioning systems, comprising:
   a frame;
   a pair of planar wall panels attached to and spaced apart by said frame, at least one of said planar wall panels including a cut out formed therein;
   a hollow interior defined by an inside surface of each said planar wall panel and said frame;
   an electrical distribution box disposed within said hollow interior and configured for being electrically connected to an electrical distribution system, said electrical distribution box including at least one connector receptacle; and
   a modular electrical assembly disposed within said hollow interior, said modular electrical assembly including a cable aperture, said modular electrical assembly comprising:
      a housing;
      at least one first electrical receptacle operatively disposed within said housing;
      a connector configured for connecting to said connector receptacle of said electrical distribution box to thereby electrically connect said connector to the electrical distribution system;
      at least one second electrical receptacle electrically connected directly to said connector, thereby electrically connecting said at least one second electrical receptacle to the electrical distribution system;
      a switch electrically interconnected between said at least one first electrical receptacle and said connector, said switch selectively controlling a flow of electrical current between said at least one first electrical receptacle and said connector, said switch being disposed at least partially within said cut out in said planar wall panel, thereby exposing at least a portion of said switch from within said hollow interior to an exterior of said wall panel assembly; and
      a conduit having a first end and a second end, said first end being received in said cable aperture and said second end connected to said connector, said conduit including a plurality of electrical conductors interconnecting said connector with said at least one second electrical receptacle and said switch.

4. The prefabricated wall panel assembly of claim 3, wherein said conduit includes a tube substantially surrounding said electrical conductors, said tube comprising one of a flexible polyvinyl chloride tube, a metallic tube, and a plastic tube.

5. A prefabricated wall panel assembly for use in office partitioning systems, comprising:
   a frame,
   a pair of planar wall panels attached to and spaced apart by said frame, at least one of said planar wall panels including a cut out formed therein,
   a hollow interior defined by an inside surface of each said planar wall panel and said frame;

an electrical distribution box disposed within said hollow interior and configured for being electrically connected to an electrical distribution system, said electrical distribution box including at least one connector receptacle; and a modular electrical assembly disposed within said hollow interior, said modular electrical assembly comprising:

a housing including a front face, said front face having a plurality of apertures therein;

at least one first electrical receptacle operatively disposed within said housing;

a connector configured for connecting to said connector receptacle of said electrical distribution box to thereby electrically connect said connector to the electrical distribution system;

at least one second electrical receptacle electrically connected directly to said connector, thereby electrically connecting said at least one second electrical receptacle to the electrical distribution system, each said at least one first electrical receptacle and each said at least one second electrical receptacle being disposed within a respective one of said plurality of apertures; and a switch electrically interconnected between said at least one first electrical receptacle and said connector, said switch selectively controlling a flow of electrical current between said at least one first electrical receptacle and said connector, said switch being disposed at least partially within said cut out in said planar wall panel, thereby exposing at least a portion of said switch from within said hollow interior to an exterior of said wall panel assembly.

6. The prefabricated wall panel assembly of claim 1, wherein said housing includes a first side, said first side including an aperture therein, said switch being disposed at least partially within said aperture in said first side.

7. The prefabricated wall panel assembly of claim 1, wherein said housing includes at least one projection configured to engage at least one corresponding slot within a frame member of the prefabricated wall panel.

8. The prefabricated wall panel assembly of claim 1, wherein said housing includes a top surface and a bottom surface, at least one of said top surface and said bottom surface including at least one projection configured to engage a corresponding slot within a frame member of the prefabricated wall panel.

9. The prefabricated wall panel assembly of claim 1, wherein said switch comprises one of a rocker switch, a rotary dimmer switch, a motion- detecting switch, and a heat-detecting switch.

10. The prefabricated wall panel assembly of claim 1, wherein said connector is configured to be received by a connector receptacle of the electrical distribution box.

11. An electrical distribution system for use within a prefabricated wall panel of an office partition system, said electrical system comprising:

an electrical distribution box configured for being disposed within a hollow interior of the prefabricated wall panel, said electrical distribution box configured for being disposed within a hollow interior of the prefabricated wall panel, said electrical distribution box including at least one connector receptacle, each connector receptacle configured for facing the hollow interior of the prefabricated wall panel; and a modular electrical assembly comprising:

a housing configured for being disposed within the hollow interior of the prefabricated wall panel;

at least one first electrical receptacle operatively disposed within said housing and configured for facing the hollow interior of the prefabricated wall panel;

a connector electrically connected to said electrical distribution box to thereby electrically connect said connector to a source of electrical current; and a switch electrically interconnected between said at least one first electrical receptacle and said connector, said switch configured for selectively controlling a flow of electrical current between each said at least one first electrical receptacle and said connector, said switch configured for being disposed at least partially within a cut-out in the prefabricated wall panel, thereby exposing said switch from within the hollow interior of the prefabricated wall panel to an exterior thereof.

12. The modular electrical assembly of claim 11, further comprising at least one second electrical receptacle electrically connected directly to said connector thereby electrically connecting said at least one second electrical receptacle to a source of electrical current.

13. An electrical distribution system for use within a prefabricated wall panel of an office partition system, said electrical distribution system comprising:

an electrical distribution box configured for being disposed within a hollow interior or the prefabricated wall panel, said electrical distribution box configured for being electrically connected to a source of electrical current, said electrical distribution box including at least one connector receptacle; and a modular electrical assembly comprising:

a housing configured for being disposed within the hollow interior of the prefabricated wall panel, said housing including a cable aperture;

at least one first electrical receptacle operatively disposed within said housing;

a connector electrically connected to said electrical distribution box to thereby electrically connect said connector to a source of electrical current;

at least one second electrical receptacle electrically connected directly to said connector thereby electrically connecting said at least one second electrical receptacle to a source of electrical current;

a switch electrically interconnected between said at least one first electrical receptacle and said connector, said switch configured for selectively controlling a flow of electrical current between each said at least one first electrical receptacle and said connector, said switch configured for being disposed at least partially within a cut-out in the prefabricated wall panel, thereby exposing said switch from within the hollow interior of the prefabricated wall panel to an exterior thereof, and a conduit having a first end and a second end, said first end received in said cable aperture and said second end connected to said connector, said conduit including a plurality of electrical conductors, said electrical conductors interconnecting said connector with said at least one second electrical receptacle and said switch.

14. The modular electrical assembly of claim 13, wherein said conduit includes a tube substantially surrounding said electrical conductors, said tube comprising one of a flexible polyvinyl chloride tube, a metallic tube, and plastic tube.

15. An electrical distribution system for use within a prefabricated wall panel of an office partition system, said electrical distribution system comprising:

an electrical distribution box configured for being disposed within a hollow interior of the prefabricated wall panel, said electrical distribution box configured for being electrically connected to a source of electrical current, said electrical distribution box including at least one connector receptacle; and a modular electrical assembly comprising:

a housing configured for being disposed within the hollow interior of the prefabricated wall panel, said housing including a front face, said front face having a plurality of apertures therein;

at least one first electrical receptacle operatively disposed within said housing;

a connector electrically connected to said electrical distribution box to thereby electrically connect said connector to a source of electrical current;

at least one second electrical receptacle electrically connected directly to said connector thereby electrically connecting said at least one second electrical receptacle to a source of electrical current, each said at least one first electrical receptacle and each said at least one second electrical receptacle being disposed within a respective one of said plurality of apertures; and a switch electrically interconnected between said at least one first electrical receptacle and said connector, said switch configured for selectively controlling a flow of electrical current between each said at least one first electrical receptacle and said connector, said switch configured for being disposed at least partially within a cut-out in the prefabricated wall panel, thereby exposing said switch from within the hollow interior of the prefabricated wall panel to an exterior thereof.

16. The modular electrical assembly of claim 11, wherein said housing includes a first side, said first side having an aperture therein, said switch being disposed at least partially within said aperture in said first side.

17. The modular electrical assembly of claim 11, wherein said switch comprises one of a rocker switch, a rotary dimmer switch, a motion-detecting switch, a sound-detecting switch, and a heat-detecting switch.

18. A modular electrical assembly for use in a prefabricated wall panel of an office partition system, said modular electrical assembly comprising:

a housing configured for being disposed within a hollow interior of the prefabricated wall panel;

at least one first electrical receptacle operatively disposed within said housing and configured for facing the hollow interior of the prefabricated wall panel;

a connector configured for being electrically connected to an electrical distribution box disposed within the prefabricated wall panel to thereby electrically connect said connector to a source electrical current;and a switch electrically interconnected between said at least one first electrical receptacle and said connector, said switch configured for selectively controlling a flow of electrical current between said at least one first electrical receptacle and said connector, said switch configured for being disposed at least partially within a cut-out in the prefabricated wall panel, thereby exposing said switch from within the hollow interior of the prefabricated wall panel to an exterior thereof.

19. The modular electrical assembly of claim 18, further comprising at least one second electrical receptacle, said at least one second electrical receptacle being electrically connected directly to said connector thereby electrically connecting said at least one second electrical receptacle to a source of electrical current.

20. The modular electrical assembly of claim 18, wherein said switch comprises one of a rocker switch, a rotary dimmer switch, a motion-detecting switch, a sound-detecting switch, and a heat-detecting switch.

* * * * *

UNITED STATES PATENT AND TRADEMARK OFFICE
CERTIFICATE OF CORRECTION

PATENT NO. : 6,388,190 B1
DATED : May 14, 2002
INVENTOR(S) : Laukhuf et al.

It is certified that error appears in the above-identified patent and that said Letters Patent is hereby corrected as shown below:

Column 1,
Line 63, delete "hours.," and substitute -- hours, -- therefor.

Column 3,
Line 32, delete "30)" and substitute -- 30 -- therefor.

Column 7,
Line 49, delete "motion- detecting switch" and substitute -- motion-detecting switch, sound-detecting switch, --
Line 60, delete "disposed within a hollow interior of the prefabricated wall panel," and substitute -- electrically connected to a source of electrical current, -- therefor.

Column 8,
Line 26, delete "or" and substitute -- of -- therefor.

Signed and Sealed this

Twelfth Day of August, 2003

JAMES E. ROGAN
*Director of the United States Patent and Trademark Office*